Oct. 31, 1950     B. R. CORSON     2,528,425
ELECTRON TUBE CATHODE HEATER
Filed Oct. 29, 1948

INVENTOR
BAYARD R. CORSON
BY
John B. Sponsler
AGENT

Patented Oct. 31, 1950

2,528,425

UNITED STATES PATENT OFFICE 2,528,425

ELECTRON TUBE CATHODE HEATER

Bayard R. Corson, Fishkill, N. Y., assignor to International Business Machines Corporation, New York, N. Y., a corporation of New York Application October 29, 1948, Serial No. 57,306

2 Claims. (Cl. 250—27.5)

This invention relates to electrical connections between small metallic conductive elements.

More particularly this invention is directed to improvements in electrical connections between the extremities of heater coils and the leads therewith associated in thermionic devices having indirectly heated cathodes.

In the manufacture of thermionic devices having indirectly heated cathodes, it is common practice to wind the heater coils, which are placed within the cathodes, using tungsten wire. Tungsten is generally chosen because of its high melting point, low vaporization rate, and its general commercial availability. While no part of this invention, one form of cathode heater is produced by winding many turns of tungsten wire about another wire or mandrel, setting the tungsten wire by heat treatment, and then dissolving out the mandrel. The resulting coiled heater is then coated with suitable insulating material and is prepared for assembly into a suitable thermionic device. Other forms of heaters such as the double helix coiled heater and the folded type heater, commonly employed in the manufacture of thermionic tubes, are also made of tungsten wire suitably covered with an insulating coating. With any of these types of heaters it is necessary to provide means for electrical connections to the ends of the tungsten wires.

As is well understood in the art, the leads from the various elements within a thermionic tube are generally brought out through the base of the device by way of a glass seal or press, that part of each lead within the tube extending from the press being usually a wire made of nickel or some similar heat resistant metal. It is also common practice to weld the various elements within the thermionic tube to the aforesaid nickel lead wires. Tungsten, the usual heater wire material, does not make a true weld with nickel under normal conditions; furthermore, while tungsten has certain distinctly desirable qualities, it is exceedingly brittle at normal room temperature. In most thermionic tube assembling processes, the welding of the ends of the tungsten heater coils to the nickel lead wires is carried out as a true weld which results in the tungsten wire being imbedded in the nickel lead at the weld point. The juncture thus formed, however, is purely mechanical, and the tungsten wire may separate from the lead under mechanical stress. Weld failures under these circumstances are not uncommon, and breakage of the tungsten wire also occurs adjacent to the juncture point due to the tungsten wire at that location being made extremely brittle by the normal spot welding process used. In order to minimize these failures in high quality thermionic devices, it has been proposed to imbed the tungsten wire by heat between two readily weldable materials; however, this method is costly and eliminates only the first cause of failure above enumerated.

It is an object of the present invention to provide a secure electrical connection between a tungsten heater element and a nickel lead wire by an improved mechanical means not subject to failure under physical stresses.

It is a further object of this invention to provide a simple and economical electrical connection between normally unweldable conductive materials by mechanical means not subject to failure by physical shock.

Other objects of the invention will be pointed out in the following description and claims and illustrated in the accompanying drawings, which disclose, by way of example, the principle of the invention and the best mode, which has been contemplated of applying that principle.

Figure 1:
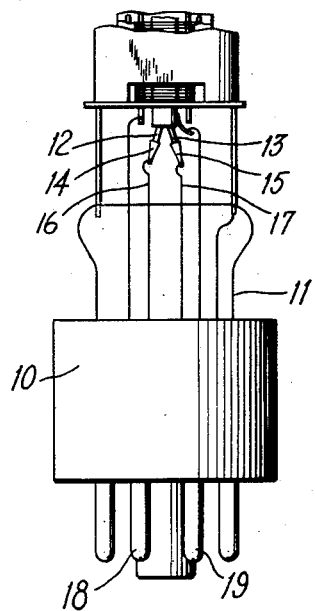
Fig. 1 illustrates a partial view of a thermionic tube wherein the features of this invention have been applied.

Now, referring to Fig. 1, is shown a cutaway portion of a vacuum tube having a base 10, a press 11, the heater coils 12 and 13 secured in the sleeves 14 and 15, respectively, which are in turn welded to the respective nickel leads 16 and 17 which pass through the press 11 and the base 10 to the contact pins 18 and 19.

Figure 2:
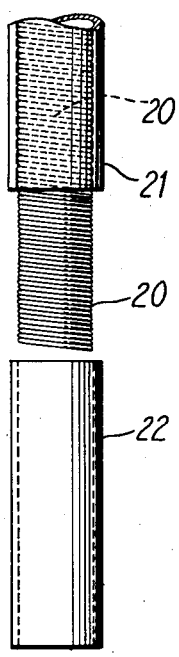
Fig. 2 shows a fragmentary view of a simple helix type heater coil and a sleeve whereby it is electrically attached.
Figure 3:
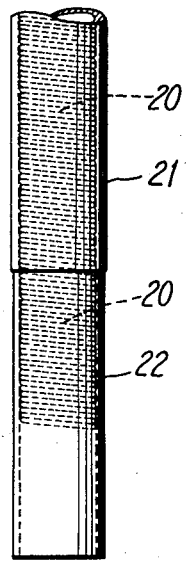
Fig. 3 illustrates a step in the process of attaching the sleeve and coil shown by Fig. 2.
Figure 4:
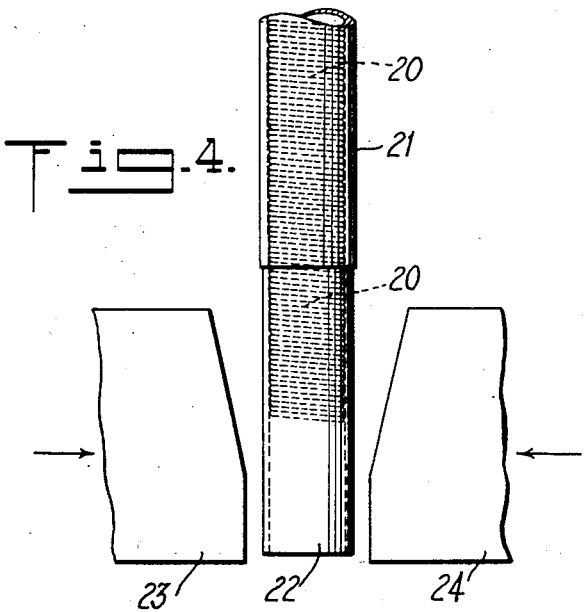
Fig. 4 shows a further step in the process of attaching the sleeve and coil of Fig. 2 including a crimping tool.
Figure 5:
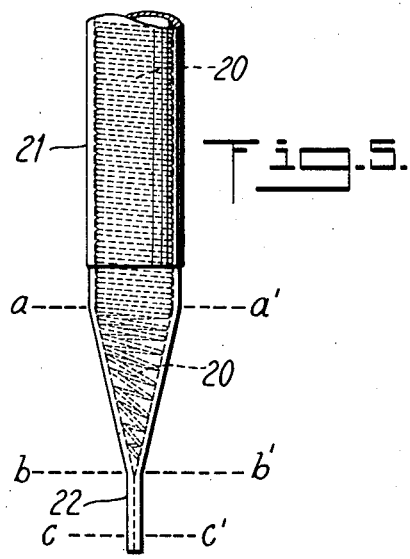
Fig. 5 shows the sleeve finally attached to the heater coil.

Fig. 2 illustrates the lower end of a coiled heater similar to coils 12 and 13 having many turns of tungsten wire 20 over a portion of which has been applied suitable protective insulating coating 21. A tubular nickel sleeve 22, having an inside diameter slightly larger than the outside diameter of the coiled tungsten wire 20, is placed over the end of the coiled wire heater permitting the coils of wire 20 to enter the sleeve 22 as shown in Fig. 3. The assembled sleeve and coiled heater are then placed in a crimping device having the tapered jaws 23 and 24 as shown in Fig. 4. Thereafter the jaws are moved together against the sleeve 22 crimping the sleeve with a gradually decreasing taper in the area from a—a' to b—b' as shown in Fig. 5. Consequently the sleeve 22 is formed over the end of the coiled tungsten wire 20 to form a nickel tab which may be readily welded along c—c' to a nickel lead in a thermionic tube assembly such as the lead 16 or 17, illustrated in Fig. 1.

It is to be noted that the sleeve 22 normally is slid over the end of the coiled wire 20 until an end of the sleeve abuts the insulating coating 21, as shown in Figs. 3, 4, and 5. In order to insure insulation continuity to strengthen the rigidity of the juncture, and to prevent "flaring" during the evacuation process after the sleeve is crimped, an insulating coating is applied over the abutment so formed, or the coating may be applied to cover the entire sleeve after the weld is made to the lead.

Tabs, as just described, provide a positive electrical connection that is not susceptible to fracture or rupture. The tapering grip of the sleeve 22 contacts the partially deformed tungsten wire coils in such a manner that only those near the area b—b' are fractured, if any, leaving the majority of the coils within the crimped sleeve in positive electrical and mechanical contact with the sleeve inner walls. Tests upon thermionic devices provided with heater connections of the type just discussed have shown that few, if any failures occur with this improved type connector, and much more reliable performance is thereby obtained.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a thermionic device having a cathode heater comprising a wire wound helical coil internal of the said cathode and having extensions beyond each end of the cathode, a connector over each of the said extensions consisting of a section of conductive tubing, the said tubing being crimped over each of the said extensions to form a conical sleeve having its apex at the extremity of each said extension and its base spaced from contact with the said cathode so that each said extension of the coil is deformed a maximum at the apex of said sleeve and a minimum at the base of said sleeve to provide electrical contact therewith.

2. In a thermionic device having a cathode heater comprising a wire wound helical coil internal of the said cathode and having extensions beyond each end of the cathode, an insulation coating over the said coil not including the said extensions, a connector over each of the said extensions consisting of a section of conductive tubing, the said tubing being crimped over each of the said extensions to form a conical sleeve having its apex at the extremity of each said extension and its base spaced from contact with the said cathode so that each said extension of the coil is deformed a maximum at the apex of said sleeve and a minimum at the base of said sleeve to provide electrical contact therewith, and an insulation coating over the said sleeves at their junctures with the said extensions.

BAYARD R. CORSON.

REFERENCES CITED

The following references are of record in the file of this patent:

UNITED STATES PATENTS

| Number | Name | Date |
|---|---|---|
| 1,032,267 | Bastian | July 9, 1912 |
| 1,937,431 | Mendel | Nov. 28, 1933 |
| 1,989,718 | Taylor | Feb. 5, 1935 |
| 2,012,689 | McFarlin | Aug. 27, 1935 |
| 2,083,196 | Liebmann | June 8, 1937 |
| 2,112,969 | Mavrogenis | Apr. 5, 1938 |
| 2,258,836 | Willner | Oct. 14, 1941 |
| 2,287,460 | Wagenhals | June 23, 1942 |
| 2,482,826 | Bender et al. | Sept. 27, 1949 |

FOREIGN PATENTS

| Number | Country | Date |
|---|---|---|
| 401,638 | Great Britain | Feb. 25, 1932 |